(12) United States Patent
Spencer et al.

(10) Patent No.: US 7,415,867 B2
(45) Date of Patent: Aug. 26, 2008

(54) GOLF SHAFT AND CLUB FLEX NEUTRALIZATION/MATCHING AND METHOD FOR MANUFACTURING SAME

(76) Inventors: David Patrick Spencer, 141 Winding Trail, Huntsville, AL (US) 35811; David Bryant Bechtel, 4801 Brownston Ct., Owens Crossroads, AL (US) 35763

( * ) Notice: Subject to any disclaimer, the term of this patent is extended or adjusted under 35 U.S.C. 154(b) by 86 days.

(21) Appl. No.: 11/626,332

(22) Filed: Jan. 23, 2007

(65) Prior Publication Data

US 2008/0176669 A1 Jul. 24, 2008

(51) Int. Cl.
*A63B 53/00* (2006.01)
*G01M 1/00* (2006.01)
*G01B 1/00* (2006.01)

(52) U.S. Cl. ............... 73/65.03; 73/65.01; 473/289; 473/290; 473/292; 33/508

(58) Field of Classification Search ........... 73/65.01, 73/65.03; 437/289, 290, 292; 33/508
See application file for complete search history.

(56) References Cited

U.S. PATENT DOCUMENTS

| | | | | | |
|---|---|---|---|---|---|
| 1,433,150 | A | * | 10/1922 | Reach | 473/251 |
| 1,675,437 | A | * | 7/1928 | Waldron | 144/355 |
| 2,660,436 | A | * | 11/1953 | Grossman | 473/237 |
| 3,577,771 | A | * | 5/1971 | Solheim | 73/65.03 |
| 3,822,477 | A | * | 7/1974 | Collins | 33/508 |
| 4,204,332 | A | * | 5/1980 | Gray | 33/508 |
| 4,245,391 | A | * | 1/1981 | Heller | 33/508 |
| 4,245,392 | A | * | 1/1981 | Heller | 33/508 |
| 4,317,568 | A | * | 3/1982 | Green | 473/238 |
| 4,569,525 | A | * | 2/1986 | Folger | 473/242 |
| 4,858,332 | A | * | 8/1989 | Thomas | 33/508 |
| 4,884,813 | A | * | 12/1989 | Cates | 473/268 |
| 4,958,834 | A | * | 9/1990 | Colbert | 473/289 |
| 5,040,279 | A | * | 8/1991 | Braly | 29/407.07 |
| 5,105,550 | A | * | 4/1992 | Shenoha | 33/508 |
| 5,205,561 | A | * | 4/1993 | Lux | 473/232 |
| 5,228,695 | A | * | 7/1993 | Meyer | 473/238 |
| 5,234,217 | A | * | 8/1993 | Johnson | 473/238 |
| 5,421,098 | A | * | 6/1995 | Muldoon | 33/508 |
| 5,480,151 | A | * | 1/1996 | Adams | 473/238 |
| 5,540,090 | A | * | 7/1996 | Wheatley | 73/65.03 |
| 5,771,552 | A | * | 6/1998 | Karner et al. | 29/407.1 |
| 5,839,181 | A | * | 11/1998 | Chu | 29/281.5 |
| 5,864,960 | A | * | 2/1999 | DeNicolo et al. | 33/508 |
| 5,870,815 | A | * | 2/1999 | Karner et al. | 29/407.1 |

(Continued)

OTHER PUBLICATIONS

Day, Bill. "Spine Finding and what to do with them after you find them". Clubmaker-online. Accessed online Jun. 4, 2008. Available online Feb. 9, 2000.*

(Continued)

*Primary Examiner*—Edward Lefkowitz
*Assistant Examiner*—Jonathan Dunlap (57) ABSTRACT

In accordance with the present invention, this method encompasses a shaft with a neutral flex point mark and identification mark/sticker of quantitative characteristics that has been achieved by deflecting a shaft, at its tip, a specific distance while resting in a free floating position. Shafts are then sorted by the quantitative measurement of its propensity to bend(flex weight) into sets of shafts to be assembled into golf clubs by aligning the neutral flex point mark on the golf shaft to the neutral point mark on a golf club head.

18 Claims, 10 Drawing Sheets

U.S. PATENT DOCUMENTS

| | | | | |
|---|---|---|---|---|
| 5,913,733 | A * | 6/1999 | Bamber | 473/317 |
| 5,976,028 | A * | 11/1999 | Ciccarello et al. | 473/289 |
| 6,183,375 | B1 * | 2/2001 | Weiss | 473/289 |
| 6,250,168 | B1 * | 6/2001 | D'Aguanno | 73/865.3 |
| 6,298,546 | B1 * | 10/2001 | Slota | 29/720 |
| 6,449,860 | B1 * | 9/2002 | Nakai | 33/508 |
| 6,895,680 | B2 * | 5/2005 | Spencer et al. | 33/508 |
| 6,915,695 | B2 * | 7/2005 | Weiss et al. | 73/579 |
| 6,990,865 | B2 * | 1/2006 | Weiss et al. | 73/579 |
| 6,993,970 | B2 * | 2/2006 | Weiss et al. | 73/579 |
| 6,997,056 | B2 * | 2/2006 | Weiss et al. | 73/579 |

OTHER PUBLICATIONS

Kaufman, John. "Inverted Flex Board". Technical Notes from Kaufman Enterprises, Club Scout Family. Accesssed online Jun. 4, 2008. Available online May 7, 2002.*

* cited by examiner

Example of NFP orientation from standard set arranged by said patent (Graph 3)

Example of Flex Weight from standard set arranged by said patent (Graph 4)

| Club | NFP Position | Flex Weight at NFP |
|---|---|---|
| 3 | 0 | 3059 |
| 4 | 0 | 3059 |
| 5 | 0 | 3059 |
| 6 | 0 | 3059 |
| 7 | 0 | 3059 |
| 8 | 0 | 3059 |
| 9 | 0 | 3059 |
| PW | 0 | 3059 |

(Table 2)

GOLF SHAFT AND CLUB FLEX NEUTRALIZATION/MATCHING AND METHOD FOR MANUFACTURING SAME

RELATED APPLICATIONS

The present application is related to U.S. Pat. No. 1,433,150, issued Oct. 1, 1922, by Reach, included by reference herein.

The present application is related to U.S. Pat. No. 1,675,437, issued Jul. 1, 1928, by Waldron, included by reference herein.

The present application is related to U.S. Pat. No. 2,660,436, issued Nov. 1, 1953, by Grossman, included by reference herein.

The present application is related to U.S. Pat. No. 3,577,771, issued May 1, 1971, by Solheim, included by reference herein.

The present application is related to U.S. Pat. No. 3,822,477, issued Jul. 1, 1974, by Collins, included by reference herein.

The present application is related to U.S. Pat. No. 4,204,332, issued May 1, 1980, by Gray, included by reference herein.

The present application is related to U.S. Pat. No. 4,245,391, issued Jan. 1, 1981, by Heller, included by reference herein.

The present application is related to U.S. Pat. No. 4,245,392, issued Jan. 1, 1981, by Heller, included by reference herein.

The present application is related to U.S. Pat. No. 4,317,568, issued Mar. 1, 1982, by Green, included by reference herein.

The present application is related to U.S. Pat. No. 4,569,525, issued Feb. 1, 1986, by Folger, included by reference herein.

The present application is related to U.S. Pat. No. 4,858,332, issued Aug. 1, 1989, by Thomas, included by reference herein.

The present application is related to U.S. Pat. No. 4,884,813, issued Dec. 1, 1989, by Cates, included by reference herein.

The present application is related to U.S. Pat. No. 4,958,834, issued Sep. 1, 1990, by Colbert, included by reference herein.

The present application is related to U.S. Pat. No. 5,040,279, issued Aug. 1, 1991, by Braly, included by reference herein.

The present application is related to U.S. Pat. No. 5,105,550, issued Apr. 1, 1992, by Shenoha, included by reference herein.

The present application is related to U.S. Pat. No. 5,205,561, issued Apr. 1, 1993, by Lux, included by reference herein.

The present application is related to U.S. Pat. No. 5,228,695, issued Jul. 1, 1993, by Meyer, included by reference herein.

The present application is related to U.S. Pat. No. 5,234,217, issued Aug. 1, 1993, by Johnson, included by reference herein.

The present application is related to U.S. Pat. No. 5,421,098, issued Jun. 1, 1995, by Muldoon, included by reference herein.

The present application is related to U.S. Pat. No. 5,480,151, issued Jan. 1, 1996, by Adams, included by reference herein.

The present application is related to U.S. Pat. No. 5,540,090, issued Jul. 1, 1996, by Wheatley, included by reference herein.

The present application is related to U.S. Pat. No. 5,771,552, issued Jun. 1, 1998, by Karner et al., included by reference herein.

The present application is related to U.S. Pat. No. 5,839,181, issued Nov. 1, 1998, by Chu, included by reference herein.

The present application is related to U.S. Pat. No. 5,864,960, issued Feb. 1, 1999, by DeHicolo et al., included by reference herein.

The present application is related to U.S. Pat. No. 5,870,815, issued Feb. 1, 1999, by Karner et al., included by reference herein.

The present application is related to U.S. Pat. No. 5,913,733, issued Jun. 1, 1999, by Bamber, included by reference herein.

The present application is related to U.S. Pat. No. 5,976,028, issued Nov. 1, 1999, by Ciccarello et al., included by reference herein.

The present application is related to U.S. Pat. No. 6,183,375, issued Feb. 1, 2001, by Weiss, included by reference herein.

The present application is related to U.S. Pat. No. 6,250,168, issued Jun. 26, 2001, by D'Aguanno, included by reference herein.

The present application is related to U.S. Pat. No. 6,895,680, issued Jul. 27, 2001, for GOLF HEAD AND SHAFT WITH FLEX NEUTRALIZATION AND METHOD FOR MANUFACTURING SAME, by Spencer et al., included by reference herein.

The present application is related to U.S. Pat. No. 6,298,546, issued Oct. 1, 2001, by Slota, included by reference herein.

The present application is related to U.S. Pat. No. 6,449,860, issued Sep. 1, 2002, by Nakai, included by reference herein.

The present application is related to U.S. Pat. No. 6,915,695, issued Jul. 12, 2005, by Weiss, included by reference herein.

The present application is related to U.S. Pat. No. 6,990,865, issued Jan. 31, 2006, by Weiss, included by reference herein.

The present application is related to U.S. Pat. No. 6,993,970, issued Feb. 7, 2006, by Weiss, included by reference herein.

The present application is related to U.S. Pat. No. 6,997,056, issued Feb. 14, 2006, by Weiss, included by reference herein.

FIELD OF THE INVENTION

The present invention is related to golf clubs and the assembly, or manufacture thereof, wherein the neutral point of a golf club head and the neutral flex point of a golf shaft have a predetermined relationship to enable more accurate use of a golf club. More specifically, the present invention is related to a method for accurately, reproducibly, and rapidly determining and marking the neutral flex point of a golf club shaft for assembly into a neutralized and flex matched club. When identifying and marking the neutral flex point of the golf club shaft, each shafts unique quantitative flex characteristics, known as Flex Weight, are recorded, allowing golf shafts/clubs to be matched together in sets based on these quantitative flex characteristics. Marking and matching golf clubs utilizing the methods taught herein and/or when used in conjunction with applicant's prior patent teaching the identification of the neutral point on a golf club head.

BACKGROUND OF THE INVENTION

It is well know that golf shafts are asymmetric with respect to the shape, material composition and force required to bend the shaft in different directions to a given flex point. This asymmetry can have very negative bending characteristics on a golf shaft when assembled into a golf club, typically occurs in the manufacture of the shaft and has been driven by the golf industries requirements for cheap and mass produced golf clubs. When golf clubs are manufactured, the asymmetry is often ignored, resulting in a set of golf clubs, by visual inspection, are matched, yet the flex of sister clubs within the set, may vary due to the different rotation of the flex asymmetry or neutral flex point, relative to the neutral position of the golf head causing the increased likelihood of a slice or hook due to a non-square clubface at impact. Or, its overall propensity to bend in relation to sister clubs, quantitative flex characteristics, which may share an identical rotation of flex asymmetry relative to the neutral position of the golf head causing a need to vary swing speed by the golfer to achieve optimum flex potential at ball impact. In the present invention, references will be made to the "Neutral Flex Point" of a golf shaft, this can be easily identified with a "point of least resistance" to bend and should never be confused with the "seam", "spine" or "material merge line" of a golf shaft. References will also be made to "Flex Weight" which denotes the quantitative measurement of a shafts propensity to bend.

In graphite shafts, unlike steel shafts, logos are generally placed on the shaft itself for marketing and advertising. Since the logo has no correlation to the placement of the "neutral flex point" mark of a shaft, once a club has been neutralized, the possibility exists that the shaft logos may fall in various positions around the golf club hosel as dictated by the Neutral flex point mark alignment to the Neutral Point of the club head. Thereby contributing to an awkward and unprofessional look in terms of a finished golf club It has long been the desire to mitigate these unpredictable bending characteristics in efforts to achieve a more consistent feel and performance in the golf club. For example, Colbert is U.S. Pat. No. 4,958,834 describes the desire to align the shaft seam with the club face in a consistent manner. Colbert specifically targets and defines a seam as the strongest point of a shaft with its true intent being to identify the physical, and potentially non-visible point where material edges were merged together to form a shaft. When looking at basic engineering principles, the attempt to identify a metal merge line does not equate or translate into an identification of a shafts "point of least resistance" to bend. I.E. When a shaft is deflected in a golf swing, the first point on a shaft, in terms of 360 degree rotation around the shaft tip, where a shaft will bend when it is deflected. Secondly, as identified by in Weiss, U.S. Pat. No. 6,183,375, line 26, "It has become apparent, however, that this technique is only approximate and generally only locates the seam in a quadrant of the four quadrants present." Furthermore, Colbert is based upon oscillating a shaft in efforts to define its weld line, nor does it teach a method to mark the "neutral flex point" of a shaft, nor does it teach a method to align the shaft to the head other than through a vague and in-precise method that is not acceptable to this patents method which relies on precision. Finally, Colbert does not define quantitative data to match shafts within a set based on similar data characteristics.

Weiss in U.S. Pat. No. 6,183,375 makes further attempts to define and refine a "seam" line designation by including references to non-visible seam lines. This has many deficiencies other than the obvious of targeting the "seam" line or material merge line as opposed to the "Neutral Flex Point".

Foremost, the Weiss invention requires the shaft butt to be clamped or fixed in place when the shafts oscillation is measured using a defined weight. Furthermore, the Weiss invention denotes another scenario where the shaft is left unclamped but bent in the middle for purposes of determining oscillation. A position that no where near resembles a golf swing and does not correspond to the Neutral Flex Point location. As denoted in the referenced patent, manual human intervention is also required to oscillate and rotate the shaft in efforts to determine its optimum point. The invention presented herein differs completely in its practical application, this patent requires the shaft to be rested in a free floating position without the aid of a clamping mechanism and each shaft is deflected at the tip only to a given position. While Weiss seeks to quantify his data characteristics by measuring the distance the shaft was deflected by a fixed weight, this invention seeks to measure the required amount of force to deflect every shaft to a specified and pre-determined distance. Weiss notes that using his invention the relative tension and compression side of a shaft can be determined and they will always be 180 degrees part. However, when using the invention as described herein, this invention is able to identify multiple "neutral bending points" or point where the shaft seeks to bend, however, these point may be anywhere between 15 and 180 degrees away from the "neutral flex point" and may exist at 3 or more points around the shaft, without correlation from shaft to shaft. Finally, Weiss does not identify a mark for precise alignment to a head mark nor does it teach a method to precisely identify the point on a head that the "Neutral Flex Point" mark should be precisely aligned to. Nor does Weiss teach a method of utilizing the characteristic data achieved from each shaft and grouping or matching golf shafts together into sets based on those unique shaft characteristics.

Weiss further builds on his Oscillation method in U.S. Pat. Nos. 6,915,695, 6,990,865, 6,993,970 and 6,997,056. But these patents still require the shaft to be Oscillated in various directions around the shaft with the butt end of the shaft clamped into place.

Braly in U.S. Pat. No. 5,040,279, is looking at a process called Frequency which is simply a measure of diminishing oscillation within a shaft and not related in any way to the "neutral flex point" of a shaft or even a shaft "seam". Obtaining the frequency of a shaft is accomplish by hanging a weight from the tip of a shaft, "twanging" it, and measuring the frequency it emits (Diminishing oscillation). Completely different in form, application and purpose. Braly then marks the point where he took the frequency measurement and denotes it specifically with a mark. Therefore Braly's mark is derived from where he took the frequency measurement due to a vibrating pattern while our mark is determined by the bending characteristics of that shaft when it is deflected, not by a humans attempt to achieve a point of reference for his measure of diminishing oscillation. Again, two completely separate marks and purposes. Additionally, Braly does specify a mark at the tip for alignment to a mark within a golf head. Braly does not teach a method of aligning that mark to a golf head. Most importantly, Braly's mark represents something completely different than the marks submitted by this applicant. Braly's one slight reference to the "seam" was his attempt to establish a basis for this invention. Visible shaft "seams" were once used as the starting point for the frequency matching as Braly defines. However, since visible "seams" have disappeared on the golf shaft, their original starting point for frequency matching disappeared. Therefore, Braly's invention was meant to be a new method in defining a starting point for determining shaft frequency. Thereby acknowledging loosing its direct correlation to what was once known as the visible shaft "seam".

D'Aguanno in U.S. Pat. No. 6,250,168 attempts to find the "spine" of the shaft by deflecting the shaft in the center into a v-shape. A position that no where near resembles a golf swing and does not correspond to the Neutral Flex Point location since he is trying to find the "strongest point of the golf shaft". D'Aguanno does not teach a method to mark the tip of the shaft for purposes of alignment nor does he teach a method to precisely align the neutral flex point mark to the neutral point of the head. Furthermore, D'Aguanno does not seek to obtain or quantify any data characteristics for the purposes of matching into sets.

The Karner U.S. Pat. Nos. 5,771,552 and 5,870,815, obviates the use of an alignment mark placed on the shaft merely for aesthetics when attaching a grip or graphic upon a shaft. The alignment mark may take the form of a line, mark or other graphic and merely acts as a reference to the club maker after the club is partially assembled and has absolutely no correlation to the "Neutral Flex Point" mark. This patent attempts to align a perceived grip or graphic line to a head using a mark in a somewhat consistent manner but the club face may be concave, convex or offset which would provide faulty alignment of the club when utilizing a one size fits all method to accommodate 6 degree drivers to 60 degree flat belly sand wedges. However, as further noted by Karner, the lone reference to a seam line is referring to the old shaft manufacturing method that resulted in visible seam lines the length of the shaft, put further noted that this concern disappeared with the invention of non-visible seam shafts. As also noted in Colbert, Weiss and Braly above.

Green U.S. Pat. No. 4,317,568 distinctly teaches a shaft to head alignment, but only to be used on a putter. Once this union is made between the club and the shaft, one would rely on Green to apply a plumb line to the putter for the purposes of reading the green contours and would be unrelated to the rotational orientation between the shaft and club head. Furthermore, Green's marks would have to be applied after the club is assembled to define a proper plumb line while the Neutralization marks contained in this patent would be required prior to the beginning of the assembly stage. At this point, it would be pointless to mark the "neutral flex point" of a shaft or the "neutral point" of the club head. In final scrutiny of Greens patent, a shaft to head alignment mark would not be truly aligned when held in a vertical position as compared to the shaft to head alignment mark in this patent due to the compensation for the plumb characteristics in the putter head that must be factored due to gravity, completely irrelevant to a club heads "neutral point". Greens application can also be applied in any 360 degree rotation of the club shaft without affecting its intended use while this patent requires a precise point on the shaft and club that should not be altered.

Ciccarello et al., U.S. Pat. No. 5,976,028, describes a method for determining a shaft seam using oscillation. This patent fails to teach a method to match Golf Shafts and Golf Clubs. There is no indication in Ciccarello et al. how a skilled artisan could align a shaft properly with the golf head. To date, any perceived alignment has been done by visual inspection.

Folger, Adams and Reach are dismissed due to the same reasons as mentioned above for Green. These inventions rely on the post golf-club-production application of alignment marks for the purpose of swing training aids. These marks do not correlate to any shaft bending characteristics nor do they relate to the "neutral flex point" or "neutral point" of a club head.

Bamber U.S. Pat. No. 5,913,733 addresses the creation of an oval shaped shaft strictly for the purposes of aerodynamics. This requires the fattest section of the shaft to be placed within the swing plane. Using basic engineering principles in the application of our method against this patent, we would disagree in the orientation of the shaft away from the stiffest section to aligning the weakest (skinniest) section to within the swing plane. Nor does Bamber teach a method of identifying or utilizing flex characteristic data achieved from each shaft and grouping or matching golf shafts together into sets based on those unique shaft characteristics.

Originating with Colbert, Weiss, Braly and Ciccerello, these prior art rely on the shaft to be clamped into position and then some form of manual manipulation is required to identify the "Seam" of the golf shaft using oscillation or frequency. In this applicant's invention, the shaft must be allowed to freely float within an identification device, so that when the shaft is deflected an exact distance, the shaft will automatically rotate by itself to the "neutral flex point" location without the need of human intervention. This applicant's invention is not capable of finding the "seam" of a golf shaft as deflection does not find that material merge line. Likewise, frequency and oscillation are incapable of finding the "neutral flex point" of a golf shaft. Furthermore, these prior art do not teach or mention a method to mark the "neutral flex point" nor do they teach a method or mention of precisely identifying the heads "neutral point" and aligning these two exact marks together to form a "Neutralized" club. Lastly, these prior art do not teach a method of identifying and quantifying these asymmetrical bending characteristic nor do then teach a method of matching these shafts together into sets of matched shafts or clubs based on the asymmetrical bending characteristics.

It has long been felt in the industry that the effect of proper use of the shaft asymmetry could enhance the performance of a golf club. This has been the opinion of club builders since they were still using hickory sticks for shafts. While this has been the opinion, it has not yet been fully tested since the methods for accurately orientating the shaft asymmetry and measuring and matching the "neutral flex points" propensity to bend have been lacking. For example, alignment of the shaft asymmetry with a device such as Karner et al. would provide some information yet the ability to accurately deviate from the square position to test for regions of improved properties is lacking. There is no technique for aligning a shaft neutral flex point at a non-neutral optimal position, for example +15 degrees from neutral, except for visual estimation which is unacceptable. Furthermore, even if improved properties are realized from the studies which are only now made available with the present invention, there is no manner in which the improvement could be utilized since there is no method for accurately determining the neutral flex point of a shaft (irregardless of seam location) then accurately orienting that mark to the club head with respect to the club face location.

Yet another problem in Karner's art is the inability to determine the relationship between the shaft asymmetry and golf head in a prepared club. After the club head is secured to the shaft, there is no way of determining, without disassembly, if the golf shaft is aligned in any specific orientation without Neutral flex point orientation marks.

While Karner and Braly do mention the use of a mark, Karner's marks are strictly related to graphics and grip orientation which is not related whatsoever to the "Neutral Flex Point" of a golf shaft. Braly also mentions the use of marks, but Braly's prior art strictly deals with a method called Frequency Matching that was introduced by True Temper in the 1970's, Braly's use of the mark only designates where the frequency measurement was taken from and does not relate or transcend in any form or fashion to a "Neutral Flex Point" mark.

Moreover, while previous patents have attempted to identify and define these unusual bending characteristics in shafts, these patents have all attempted to solve this problem by focusing on a shafts oscillation pattern in a machine with one or more ends of a shaft clamped or affixed as stationary. The terms Frequency and Oscillation are basically defined as "a measurement of diminishing vibration patterns" and used strictly by these patents to define the "seam" line (Material merge line) of a shaft. While frequency and oscillation may be beneficial in determining the "seam" or material merge line in a shaft, they do not correspond to defining the "neutral flex point" of a shaft. Neutral Flex Point seeks to define the point around a shaft tip which bends first when a load is placed upon a shaft in a golf swing. Finally, Weiss does mention a form of deflection that requires the shaft to be bent in the center to identify the "seam" line. A skilled artisan would easily realize that a golf shaft does not bend in the center and would be incapable of finding the "neutral flex point" mark at the tip of the shaft when it is being deflected in the center of the shaft. However, Weiss is subject to numerous deficiencies by failing to teach the quantification or identification of the bending characteristics, matching the shafts by those characteristics, identifying and marking the "neutral flex point" of a shaft, identifying and marking the "neutral point" of a head or the process of neutralizing a golf club by aligning these specific marks together.

Finally, this method is the only one that is capable of performing all of these claims listed without the need, or error induced by human intervention in a manufacturing environment. This method can be accomplished in seconds while other patents may require minutes per shaft/club.

OBJECTS OF THE INVENTION

It is therefore an object of the invention to provide a method for manufacturing and assembling golf clubs which allow for the optimum orientation of the shafts neutral flex point and the neutral point of the golf club head.

It is another object of the invention to provide a method which provides quick, accurate and sure orientation of a shafts neutral flex point and a golf club heads neutral point using visible or non-visible marks.

It is another object of the invention to define a quantitative measurement of the shafts propensity to bend at its neutral flex point (point of least resistance to bend) and to further match and sort golf shafts and golf clubs based on those quantitative measurements.

It is another object of the invention through the use of marks to be able to readily identify the location of the shafts neutral flex point in relation to the golf club head while the club is still in the assembly stage or in the post production stage. (Already assembled)

It is another object of the invention to quantify the unique bending characteristics of each shaft by measuring the amount of force required to deflect a shaft at the tip a specific distance while resting in a free-floating position.

It is another object of the invention through the use of unique identification marks/stickers on each golf shaft, to readily remember and identify the specific bending properties of each shaft. These identification marks/stickers are used in case a user breaks a shaft or wishes to replace their shafts, so that they may obtain new shafts with the exact same quantitative measured bending properties.

It is another object of the invention through the defined quantitative measurements of the shafts propensity to bend, to set new flex standards for shafts. Expanding the 4 basic flex's of A,L,R,S to include sub flexes within each flex of soft, standard, firm and such. I.E. Regular Soft, Regular, Regular Firm . . . . Furthermore, using the method defined herein, a limitless number of flex's can be determined based on swing speed (72 vs 75 mpb), swing style (short vs long back swing material composition (graphite, steel or such), component shape (wind resistance affect on club flex), component weight (40 grm 5 iron vs 70 grm 5 iron) and such It is another object of the invention through the defined quantitative measurements of the shafts propensity to bend, to begin to evaluate and compare the overall flex of shafts between manufacturers in an effort to establish a database of all shafts bending characteristics in efforts to determine which shafts from which manufacturers most closely relate to shafts from other manufacturers.

It is another object of the invention to provide a method to mark the shafts neutral flex point prior to the logo being affixed so that the logo printers will have a frame of reference when applying a logo to a shaft that would result in uniform logo placement on shafts, thereby eliminating the awkward and unprofessional look that is a by product today of injecting this method after logos have been affixed.

A particular feature of the present invention is the ability to orient the shaft neutral flex point and the golf club head neutral point in a specific position repeatedly through a set of golf clubs so that a matched set can be prepared with a custom orientation.

These and other advantages, as will be realized are provided in a golf club shaft comprising a neutral flex point mark & identification mark/sticker when aligned to a golf club head comprising a neutral point mark as defined in U.S. Pat. No. 6,895,680

SUMMARY OF THE INVENTION

In accordance with the present invention, this method encompasses a shaft with a neutral flex point mark and a unique identification mark/sticker to identify quantitative characteristics that have been achieved by deflecting a shaft, at its tip, a specific distance while resting in a free floating position. Shafts are then sorted by the quantitative measurement of its propensity to bend into sets of shafts to be assembled into golf clubs by aligning the neutral flex point mark on the golf shaft to the neutral point mark on a golf club head.

BRIEF DESCRIPTION OF THE DRAWINGS

A complete understanding of the present invention may be obtained by reference to the accompanying drawings, when considered in conjunction with the subsequent, detailed description, in which.

DESCRIPTION OF THE PREFERRED EMBODIMENT

The invention will be described with reference to the drawings wherein similar elements are numbered accordingly.

The location of the Neutral Flex Point of a golf club shaft can be found utilizing an invention of various configurations or material property's, however they must incorporate standard processes in order to ensure accurate and reproducible measurements. These processes will be described with reference to FIG. 1, a working view of an invention, FIG. 2, a top view of same invention and FIG. 3, an end view of same invention, where a golf shaft is determined to be "at-rest" from a deflection standpoint.

Figure 1:
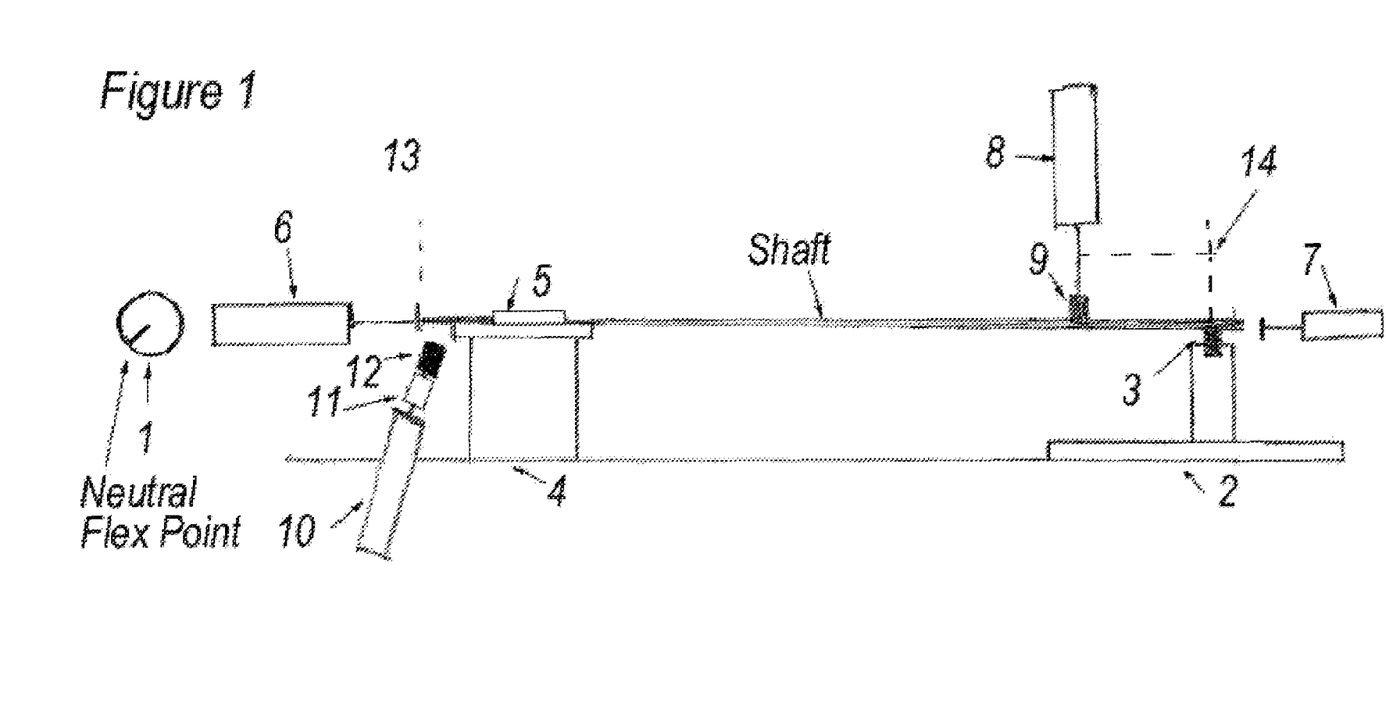
FIG. 1 is a front elevation view of a golf shaft "at-rest" within troughs of said invention; and an end view of a golf shaft, 1, reflecting an arbitrary neutral flex point starting location of roughly 230 degrees

FIG. 1 includes an end view of a shaft, 1, where the "Neutral Flex Point" location has been marked and positioned in the bottom left hand corner, or located at 230 degrees of the circular diameter along its longitudinal axis. Normally, this location would not be know but is being pre-defined within this patent to demonstrate the action/reactionary forces that are applied to the golf shaft through this method. The invention includes a Moveable Base 2, topped by a Butt Bearing Assembly, 3, arranged in a trough formation so that the "Neutral Flex Point" of every length shaft may be readily identified. The golf shaft butt rests within the bearing trough of, 3, allowing the shaft to span the gap to the Print Riser 4. The print riser, 4, comprises a resting plate topped by interchangeable Shaft Diameter Compensation Plates, 5, to accommodate the various shaft tip diameters between irons and woods. The troughs, 3, 5 and 9 ensure the shaft does not move out of place in the Neutral Flex Point identification and permanent marking process. In FIG. 1, Tip Centering Device, 6, is first engaged to the Tip Reference Point, 13, the Butt Centering Device, 7, is engaged at the butt of the shaft to push the shaft tip to the Tip Reference Point, 13, to ensure reproducible flex weight measurement application. When the shaft has been directed to the Tip Reference Point, 13, centering devices 6 and 7 are disengaged from the golf shaft and the Front Grip Bearing Assembly, 9, is engaged against the golf shaft butt area by the Front Grip Actuator, 8, which is located a fixed distance, 14, from the Butt Bearings, 3, to represent the avg distance spanned by a golfers grip of the golf shaft. The Front Grip Bearing Assembly, 9, comprises a set of free-floating ball-bearings arranged in a trough, engaged in counter balance against the shaft and Butt Bearings, 3. The shaft must be placed in free-floating form itself and allowed to freely rotate when simply twisted with the application of torsional force.

Figure 2:
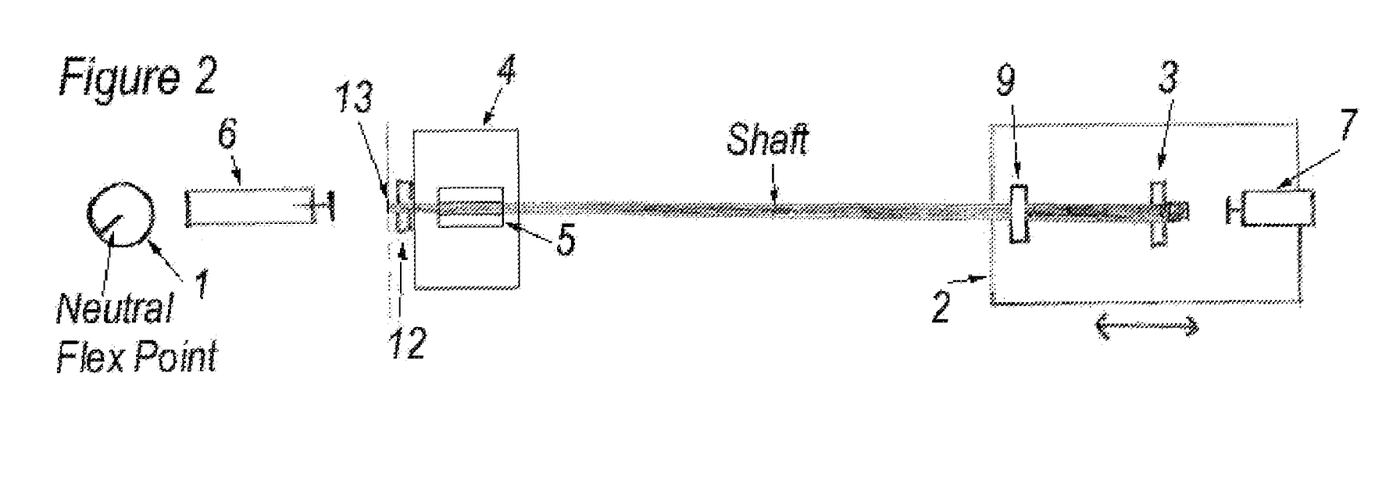
FIG. 2 is a top perspective view of a golf shaft "at-rest" within the troughs of the invention; and an end view of a golf shaft, 1

FIG. 2 is a top view of the same FIG. 1 description with the Tip Centering Device disengaged prior to deflection.

Figure 3:
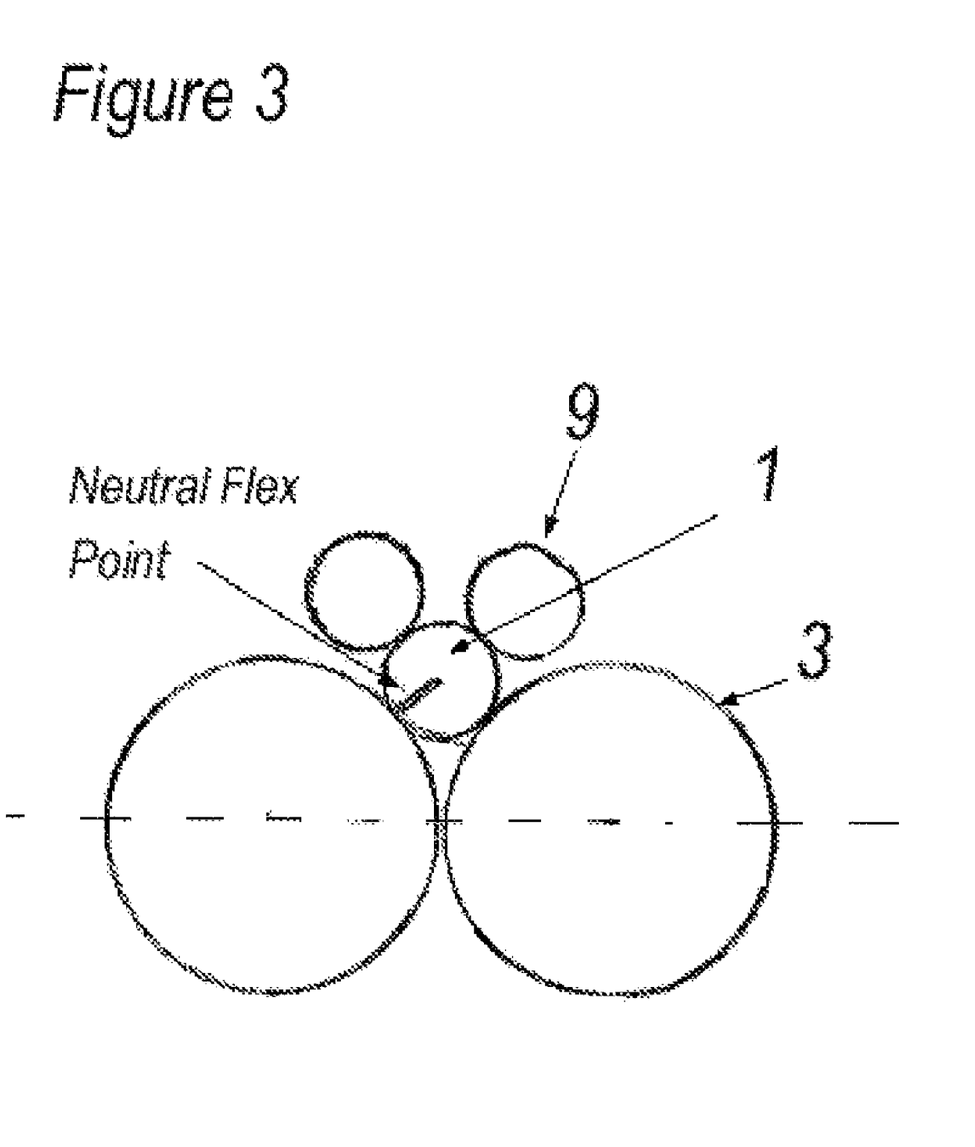
FIG. 3 is a right partial view of a golf shaft "at-rest" between the ball-bearing troughs of the moveable base, 3, and grip stabilizer, 9; and an end view of a golf shaft, 1

FIG. 3 is an end view cut-away of an invention showing the golf club shaft resting on the Butt Bearing Assembly, 3, engaged in counter balance by the Grip Bearing Assembly, 9, which is firmly yet loosely engaged in counter balance against the shaft butt area, 14, as defined in FIG. 1. Item 1, is the same butt-end view of a shaft shown in FIG. 1, where the "Neutral Flex Point" location has been marked and positioned in the bottom left hand corner, or located at 230 degrees of the circular diameter. Again, this location would not normally be known ahead of time, hence the purpose of the invention.

Figure 4:
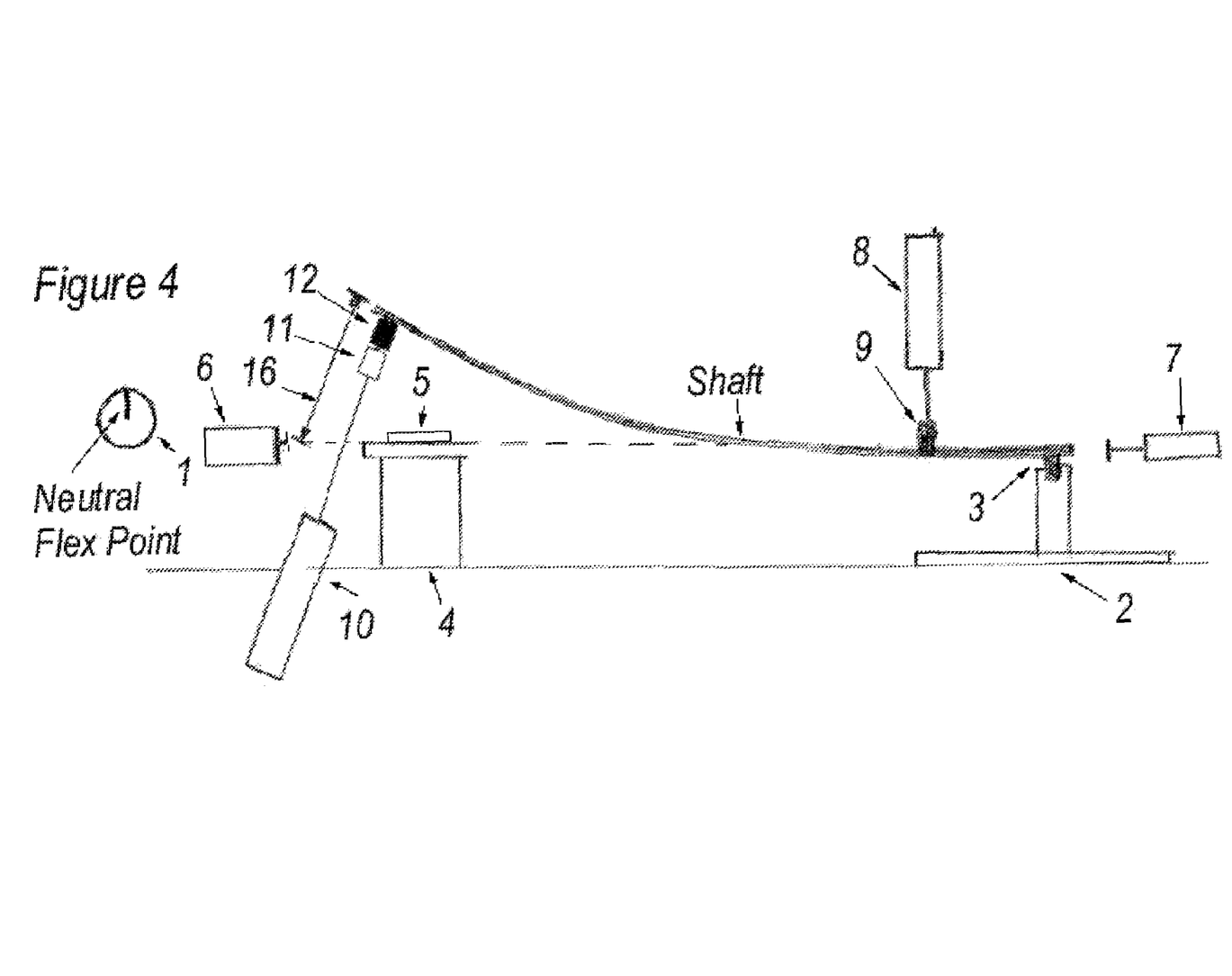
FIG. 4 is a front elevation view of a golf shaft "deflected" by the deflector, 10,11,12, for the expressed purpose of determining the "neutral flex point" location and the flex weight force required to deflect the shaft a defined distance; and an end view of a golf shaft, 1, reflecting the final neutral flex point location due to torsional rotation of a shaft when force is applied to resemble a golf swing
Figure 5:
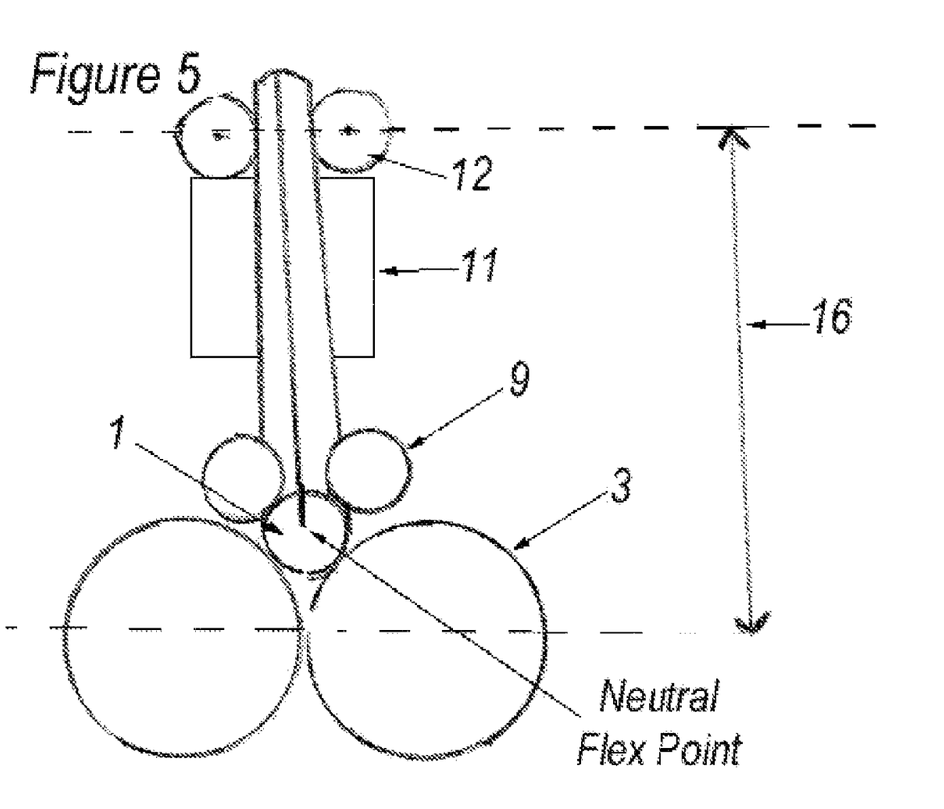
FIG. 5 is a right partial view of a golf shaft "deflected" to a defined distance by the deflector, 10,11,12, at the tip of the shaft and counter-balanced by the moveable base, 2,3, and grip stabilizer, 9; and end view of a golf shaft, 1

FIGS. 4 and 5 demonstrate the principle action and reaction of a golf shaft when it has been deflected for the purpose of identifying the golf club shafts "Neutral Flex Point"

FIG. 4 is a working view cut-away of an invention where centering devices, 6 and 7, have been disengaged from the ends of the golf club shaft and the Front Grip Bearing Assembly, 9, has been engaged in counter balance against the shaft and Butt Bearing Assembly, 3. A Tip Bearing Actuator, 10, Load Cell, 11, and Tip Bearing Assembly, 12, are engaged to a fixed distance, 16, against the tip of the golf shaft with the necessary force to bend the golf shaft in such a manner as to resemble the loading of a golf club shaft in a golf swing. When the Tip Bearing Actuator, 10, has been fully engaged, a measurable amount of load at the "Neutral Flex Point" location will be defined by the Load Cell, 11. This defined measurement is known as Flex Weight.

In FIG. 4, The Tip Bearing Actuator, 10, includes a load cell device, 11, affixed with a Tip Bearing Assembly, 12, arranged in a trough formation. When the tip of the shaft has been engaged by the Tip Bearing Assembly, 12, torsional forces created by the deflection of asymmetrical material or shape composition shafts will create a reactionary force by the golf shaft causing the shaft to rotate to a "point of least resistance" to bend, or the "Neutral Flex Point". This "point of least resistance", as confirmed by the load cell, 11, and illustrated in 1, a butt-end view of the golf shaft with the new "Neutral Flex Point" mark orientation as compared to its original starting location of 230 degrees (arbitrary starting point). To rotate the shaft when the shaft has been engaged in the deflection referenced in FIG. 4, torsional force must be applied to twist the shaft out of the "Neutral Flex Point" position greater than the Flex Weight applied at the "Neutral Flex Point" when deflected. The Front Grip Actuator, 8, must be adjustable to compensate for changes in temperature and humidity which greatly affects the relative stiffness of a shaft from day to day. A single shaft's Flex Weight utilizing the preferred embodiment may change from day to day due to overall Humidity and Temperature compared to the previous day or days. Uniform flex weight measurement from day to day must be achieved in order to maintain consistency in flex weight measurement and matching over the life cycle of this invention.

FIGS. 3 and 5 reveal the easiest determination of the "Neutral Flex Point" location when viewing the shaft along it entire axis. FIG. 3, is an butt end view of the same shaft, 1, specifically representing a golf shaft "at rest" within an invention with a pre-defined "Neutral Flex Point" mark, spanning the bottom left edge or 230 degrees of the shaft diameter stretching from the butt to the tip. FIG. 5 is a butt end view of the same shaft, 1, "deflected" to a fixed distance, 16, at its tip. Furthermore, the visual reference to FIG. 1, Item 1 and FIG. 5, Item 1, demonstrates how the shaft will naturally rotate from its original position in FIG. 1, Item 1 at a location of 230 degrees (arbitrary starting point) and naturally seek a "point of least resistance" or "Neutral Flex Point" location in FIG. 5, Item 1 at a 0 degrees location. The original starting point of an unknown "Neutral Flex Point" mark will naturally rotate to the "point of least resistance", 0 degrees, irregardless of the starting position of the "Neutral Flex Point."

Figure 6:
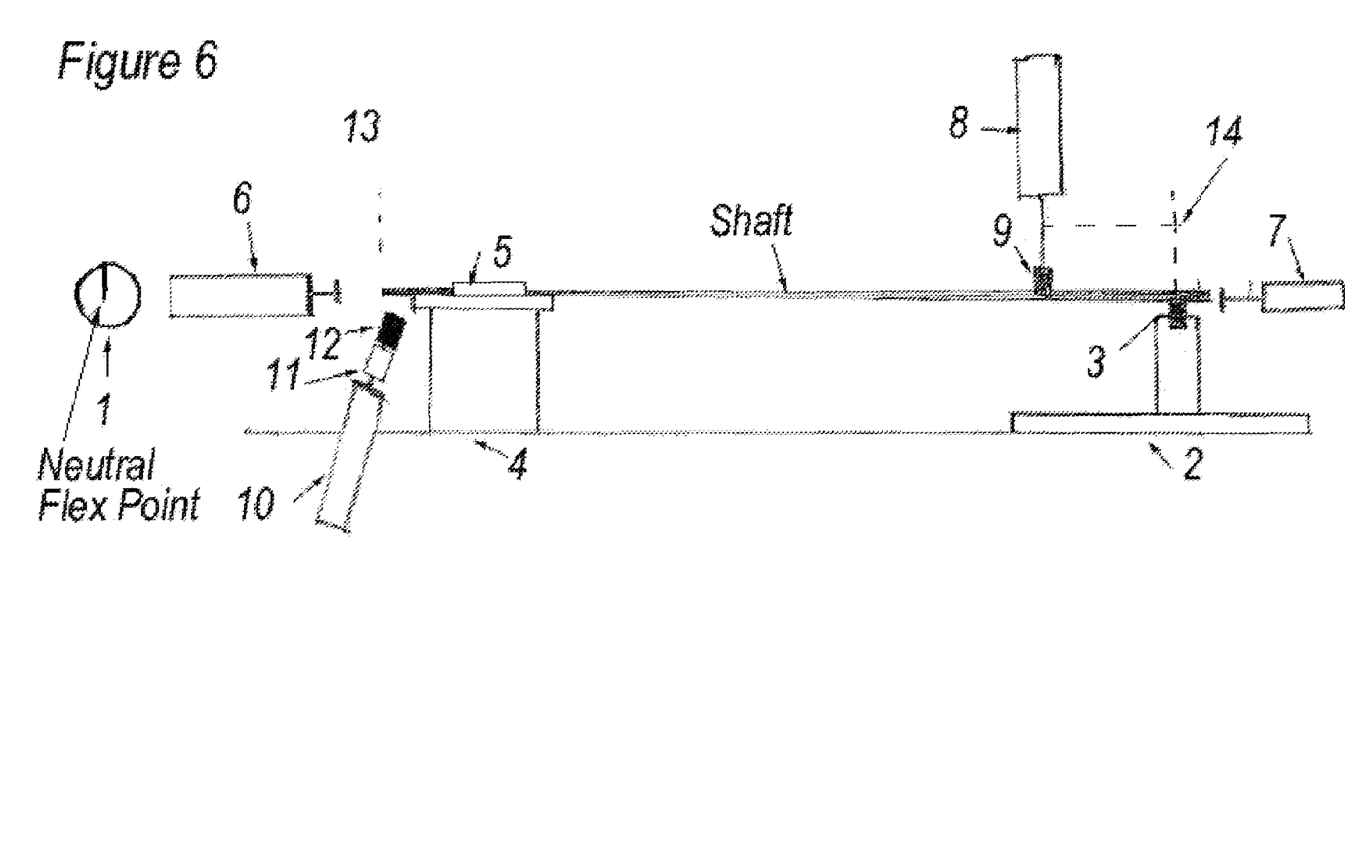
FIG. 6 is a front elevation view of a golf shaft where the "neutral flex point" has been returned to an "at-rest" position between the ball-bearing troughs of the moveable base, 3, and grip stabilizer, 9; and end view of a golf shaft, 1, resting in its final print location with the Neutral Flex Point located at 0 degrees

FIG. 6 is a working view of the preferred embodiment after the "Neutral Flex Point" of the shaft has been located. The Tip Bearing Actuator, 10, Load Cell, 11, and Tip Bearing Assembly, 12, have been retracted to its original starting position and the shaft tip has been returned to its starting point within the Shaft Diameter Compensation Plate, 5. The shaft, as illustrated in 1, will be returned to the Shaft Diameter Compensation Plate, 5, the "Neutral Flex Point" will always be located at the 0 degrees location and ready for permanent "Neutral Flex Point" marking.

Figure 7:
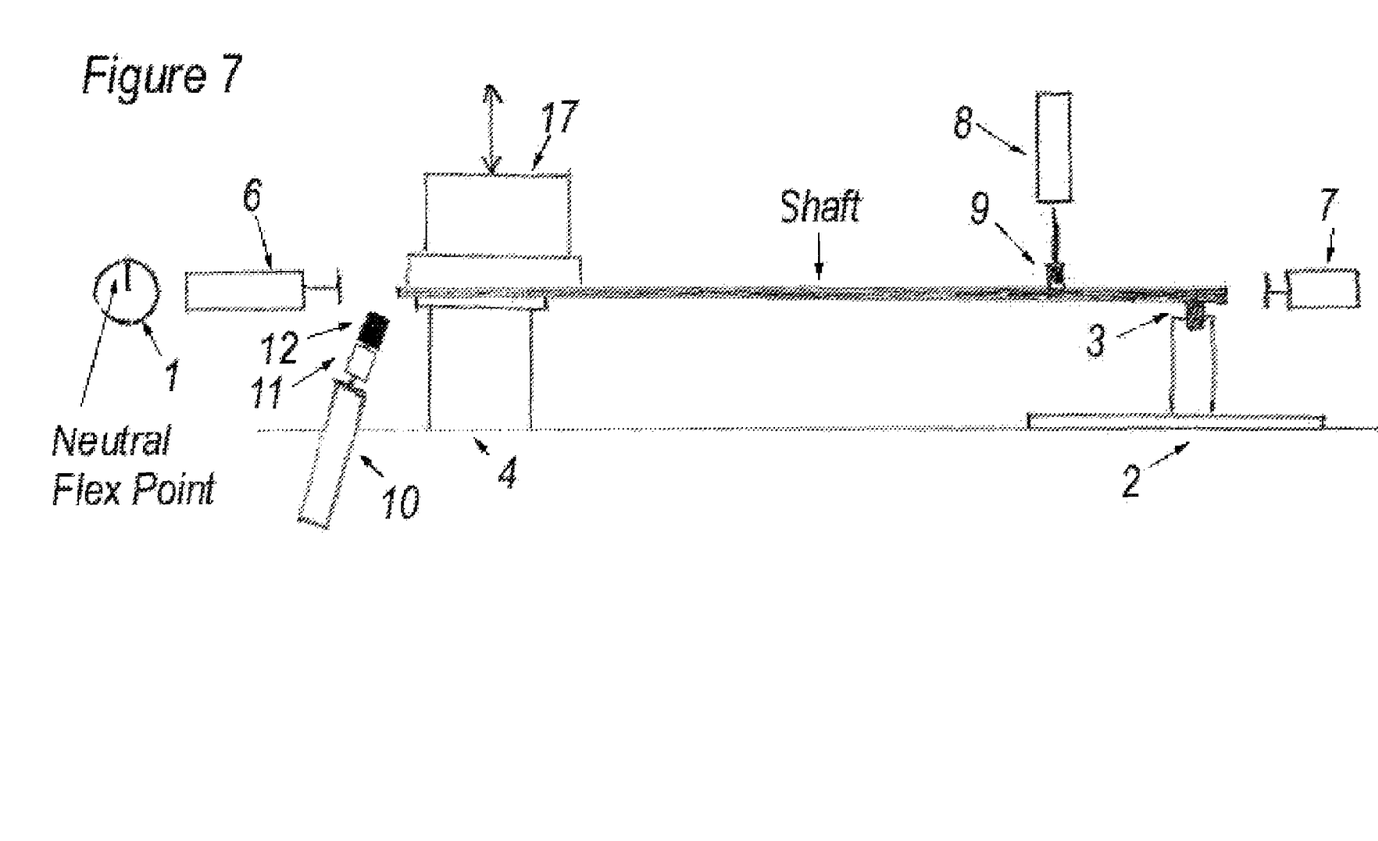
FIG. 7 is a front elevation view of a golf shaft where the "neutral flex point" has already been identified and a print assembly, 17, has been engaged against the shaft for the purpose of affixing a permanent "neutral flex point" mark and the unique flex characteristics at the shafts "neutral flex point" location

FIG. 7 is working view of the preferred embodiment with a retractable Print Assembly 17, comprising a marking mechanism aligned to print a "Neutral Flex Point" mark on the shaft tip after the "Neutral Flex Point" has been identified.

Figure 8:
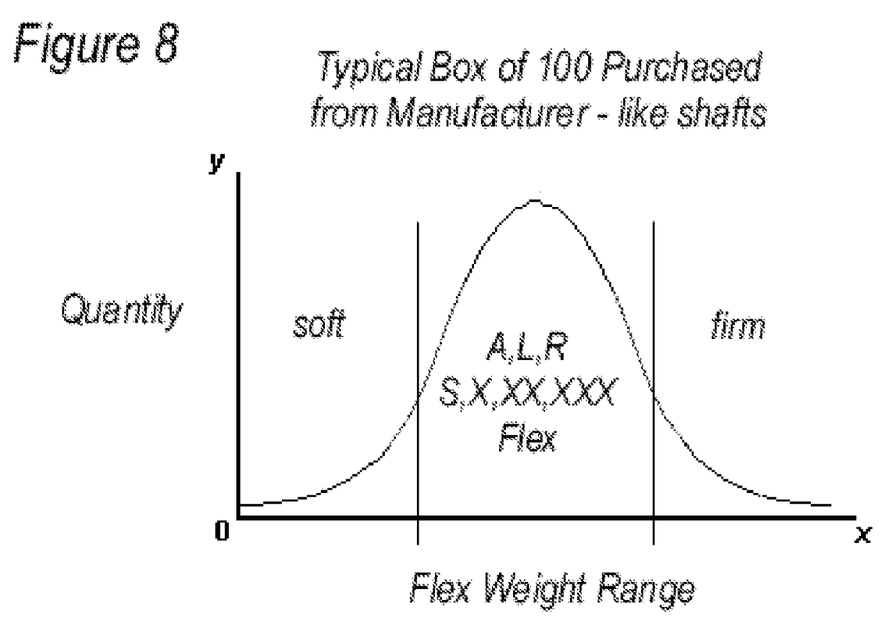
FIG. 8 is a perspective view of a golf shaft flex weight chart where quantitative flex characteristics are mapped to define the sub-flex of each golf shaft, shafts are grouped into sets based on this mapping
Figure 9:
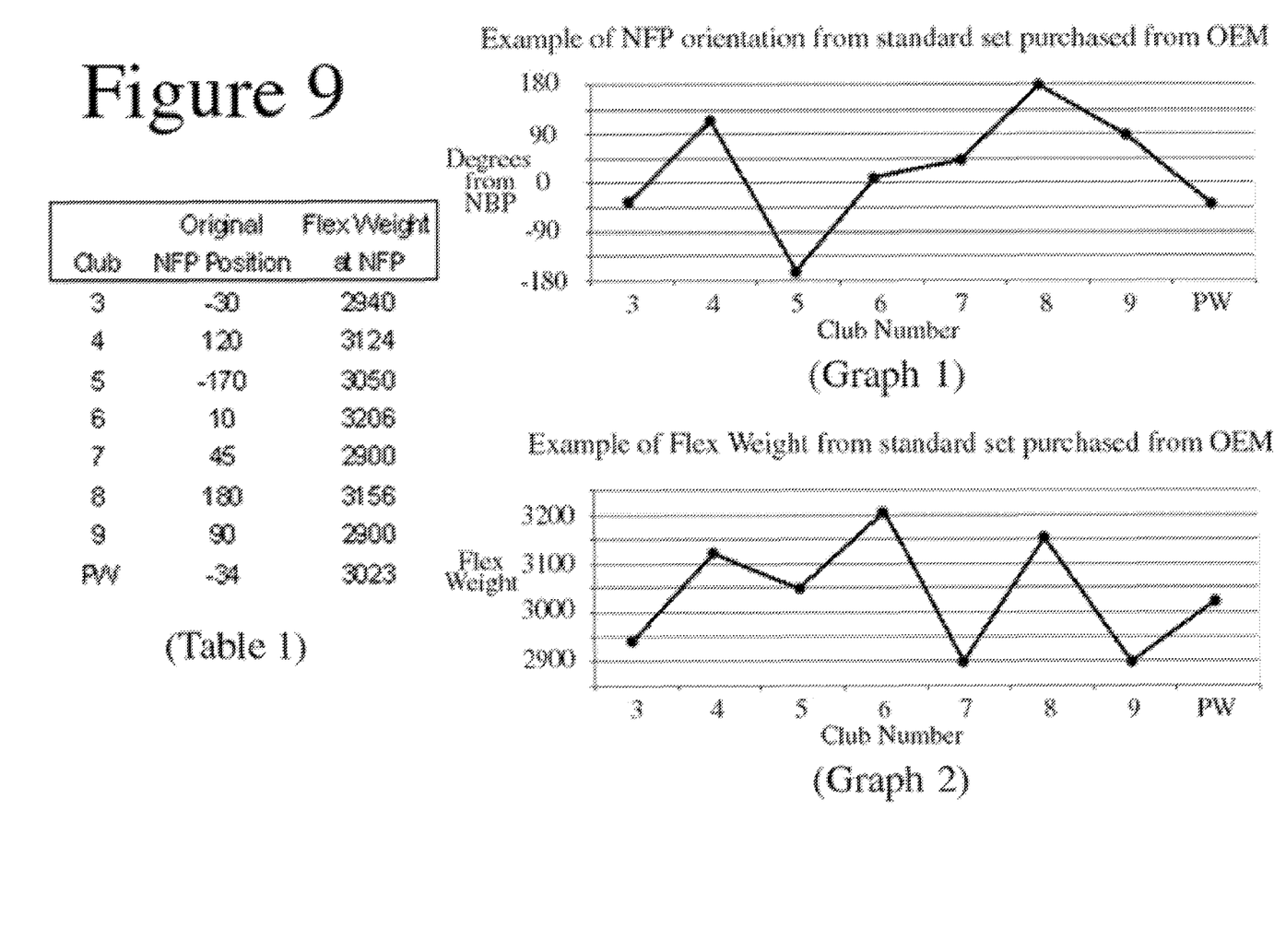
FIG. 9 is a perspective view of a non-neutralized or flex matched golf shafts and golf clubs where the Neutral Flex Point is not aligned to the Neutral Point of a club head, nor matched into a set based on flex characteristics

Once the "Neutral Flex Point" has been identified and marked on the golf shaft, the Identification Mark/Sticker is affixed which details the quantitative characteristics determined using the process/invention described above. The shafts are grouped into sets based on these quantitative characteristics FIG. 8, represents a Bell Curve Chart defining the sub flex of a shafts overall stiffness due to a defined Flex Weight range of shafts when purchasing a group of identical shafts from a manufacturer in the market today, irregardless of base flex A,L,R or S. Shafts within a high flex weight on the bell curve will be deemed as "Firm" while shafts with a lower than normal flex weight on the bell curve will be deemed as "Soft" with the expressed intention of producing matched sets of golf clubs. These categories defined on the Bell Curve can encompass as few as 1 or a limitless set of flex categories further defined by a limitless number of factor's based on swing speed (72 vs 75 mpb), swing style (short vs long back swing) material composition (graphite, steel or such), component shape (wind resistance affect on club flex), component weight (40 grm 5 iron vs 70 grm 5 iron) and such FIG. 9, represents a typical example of all sets of clubs assembled in the market today and their inconsistent shaft characteristics as defined by Neutral Flex Point location in relation to the Neutral Point of a club head and shaft Flex Weight characteristics that would be applied to a typical set of clubs during assembly and purchased from a club builder or manufacturer not utilizing the preferred embodiment. FIG. 9, Table 1 contains an example quantitative data set representative of current manufacturing capabilities as can be identified utilizing the preferred embodiment. Graph 1 displays a visual representation of the data set show in FIG. 9, Table 1, more specifically, the Neutral Flex Point location in relation to the Neutral Point on the club head when a set of clubs had been assembled without using the preferred embodiment. When clubs have been assembled in this manner, the Neutral Flex Point of the golf shaft will always bend first due to the quantitative fact that it takes the least amount of force to bend the shaft at that location. Therefore, when the club has been arranged in the manner shown in Graph 1, improper Neutral Flex Point alignment will force the shaft to bend out of the golfers swing plane when the shaft is loaded and unloaded in the golf swing leading to a high percentage of slices and hooks. FIG. 9, Graph 2 displays a visual representation of the same set of clubs and data set where Flex Weight matching has not been utilized in the preferred embodiment. Inconsistent flex weight matching within in a set will result in golf clubs which will require variable swing speeds from club to club within the same set. This could be further evidenced if all clubs within the same set were replaced with 8 identical club heads of make, model and number. Theoretically based on club assembly practiced today, a set of 8 identical 5 irons should play exactly the same. The Flex Weight matching principles taught within this preferred embodiment demonstrates that this case is not true due to the varying Flex Weight shafts that are produced in the market today. Shafts with a higher flex weight would require more swing speed to achieve the same deflection distance than shafts with a lower flex weight.

When sets of golf clubs have been assembled as shown without regard to consistent Neutral Flex Point location at the Neutral Point of the club head or matching shaft Flex Weight characteristics, each clubs playability within a set is greatly diminished, resulting in induced slicing and hooking of the ball due to inconsistent bend location within the golfers swing plane caused from miss-alignment of the Neutral Flex Point and variable shaft stiffness as much or more than 20% from club to club within a set. This will result in golfers modifying their swing style or speed to overcome the negative effects induced by improper alignment or the lack of flex matching. The example data set shown in FIG. 9 is not confined to sets of irons but is uniform throughout the industry in the practice of wood, iron, utility or hybrid club manufacturer and assembly.

Figure 10:
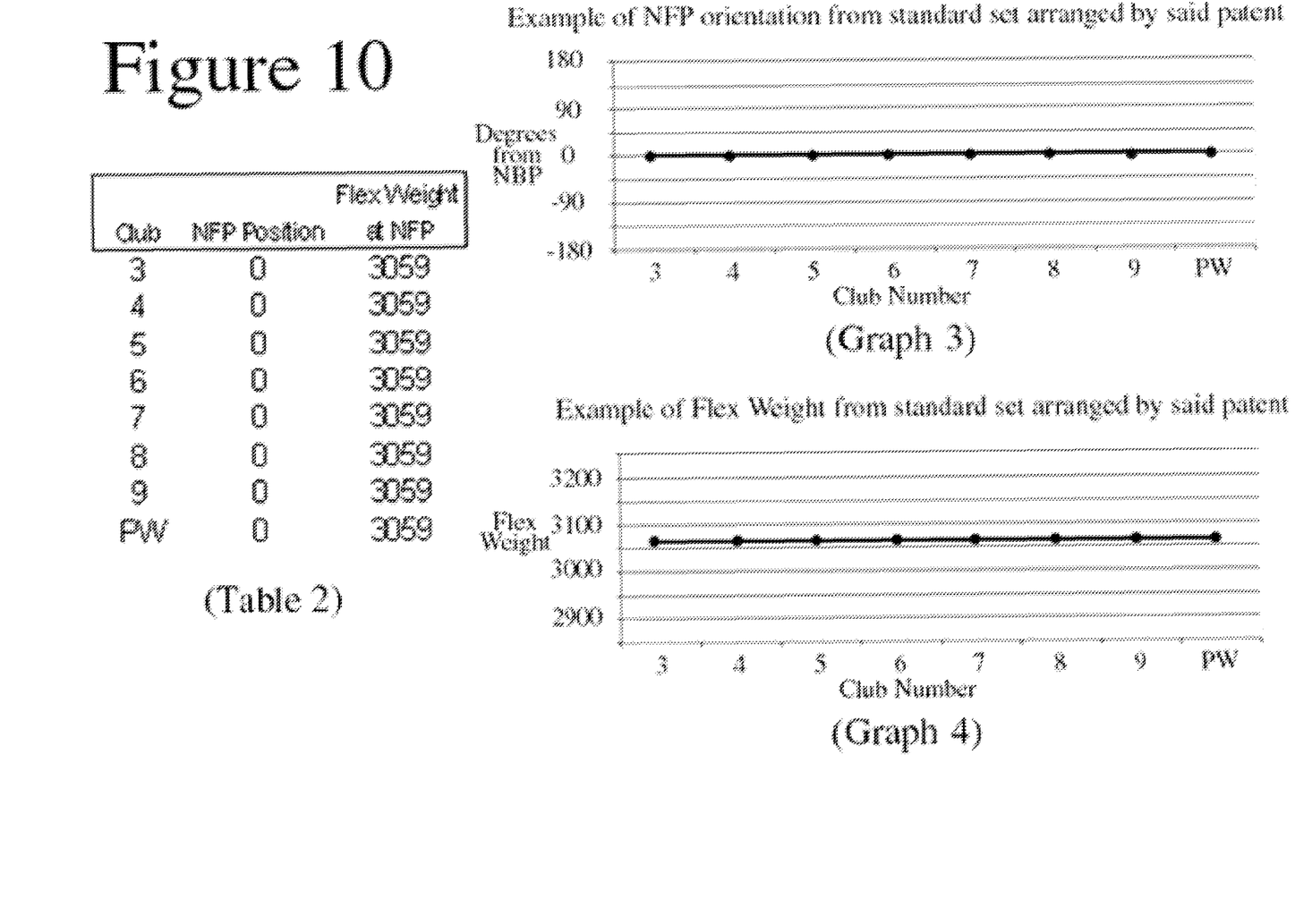
FIG. 10 is a perspective view of a neutralized and flex matched golf shafts and golf clubs where the Neutral Flex Point is aligned to the Neutral Point of a club head and matched into sets based on flex characteristics For purposes of clarity and brevity, like elements and components will bear the same designations and numbering throughout the Figures.

FIG. 10, represents a set of the clubs assembled utilizing the preferred embodiment. This set demonstrates proper Neutral Flex Point location in relation to the Neutral Point of the Club Head and matched shaft Flex Weight characteristics that would be applied to a typical set of clubs purchased from a club builder or manufacturer utilizing the preferred embodiment. FIG. 10, Table 2 contains an example quantitative data set representative of proper application of the methods taught within the preferred embodiment. Graph 3 displays a visual representation of the data set show in FIG. 10, Table 2, more specifically, the Neutral Flex Point location in relation to the Neutral Point on the head when a set of clubs had been assembled using the preferred embodiment. Golf Clubs assembled utilizing the preferred embodiment would immediately increase playability and straighten ball flight by ensuring the neutral flex point does not bend out of the golfers swing plane when the shaft is loaded or unloaded in a golf swing. FIG. 10, Graph 4 displays a visual representation of Flex Weight matching applied to a set of clubs and data sets where Flex Weight matching has been utilized in the preferred embodiment. Golf Clubs assembled utilizing Flex Weight Matching will immediately result in uniform shaft deflection stiffness when compared shaft to shaft within a set. When sets of golf clubs have been assembled as shown in FIG. 10, each clubs playability and feel is immediately increased due to consistent ball striking when the shaft is forced to bend only in the golfers swing plane and with consistent shaft flexibility as defined by Flex Weight from club to club within a set. Furthermore, Flex Matching will allow woods, irons, hybrids and utility clubs to be matched together into overall golf club set where shaft flex characteristics have been matched among all clubs within a golfer's bag. Utilizing the preferred embodiment, the golf club can finally be assembled as it was originally intended and desired by the USGA, Royal and Ancients and other golf club organizations around the world. Further benefits can be immediately recognized when considering golfers tend to break, acquire and replace new golf clubs routinely. Utilizing the quantitative data characteristics taught within the preferred embodiment, truly identical and duplicate clubs can be returned to the golfer's bag without requiring the golfer to learn a new club as required today.

The method as shown in U.S. Pat. No. 6,895,680 may be employed and the disclosure of U.S. Pat. No. 6,895,680 is incorporated herein by reference. According to the forsaid patent, FIG. 2 identifies a Neutral Point of a golf club head, 11, for the purpose of identifying a location on a golf club hosel which is parallel to the target line of the golf club face. Utilizing the method employed in U.S. Pat. No. 6,895,680 to identify the Neutral Point of a golf club head, the Neutral Flex Point as identified by this patent application may be aligned for final golf club assembly where any negative effects of improper alignment of the Neutral Flex Point may be neutralized to achieve optimum club performance.

Furthermore, the Neutral Flex Point could be manipulated in respect to its alignment to the Neutral Point of the golf club head to manipulate the performance of the golf club to induce a slice or hook. Furthermore, an induced slice or hook can be minimized or accentuated due to the controlled and identifiable relationship of said alignment mark positioning in relationship to one another.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. An apparatus for rapidly determining and marking the point of least resistance to bending, "Neutral Flex Point", within a golf shaft and club, the apparatus comprising:
   a first trough positioned near the butt end of the shaft for the shaft to sit within for maintaining an accurate reference point when working with shafts of different lengths;
   a second trough positioned near the tip end of the shaft for the shaft to sit within;
   a plurality of interchangeable trough trays of pre-defined trough widths based on varying shaft tip diameters, whereby a single trough tray is located within said second trough for the shaft tip to sit within;
   a reproducible tip reference locator with extending and retracting tip reference positioner for establishing a pre-defined shaft tip location to ensure consistent and reproducible measurements of flex weight force;
   a butt positioning device for moving the shaft to a pre-defined location so that the tip of the shaft rests at a uniform and pre-defined tip reference point, ensuring the flex weight measurement is obtained from the exact same point on the tip of a shaft regardless of shaft overall length;
   an adjustable force regulator and trough assembly for exerting pressure against the golf shaft at the butt area in a counter balancing effort against the moveable base to simulate a golfer's grip during a golf swing, whereby said adjustable force regulator adjusts pressure exerted on the golf shaft for the to compensate for humidity and temperature changes to the environment;
   an actuator to exert a measurable force upon the tip of the shaft over a pre-defined distance of deflection of the shaft; and
   a retractable print assembly for permanently affixing a "Neutral Flex Point" mark, unique flex weight and identification characteristics on said golf shaft at its neutral flex point location.

2. The apparatus for rapidly determining and marking the point of least resistance to bending, "Neutral Flex Point", within a golf shaft and club in accordance with claim 1, wherein said first trough is free-floating, moveable and comprises bearings.

3. The apparatus for rapidly determining and marking the point of least resistance to bending, "Neutral Flex Point", within a golf shaft and club in accordance with claim 1, wherein said second trough comprises a print riser.

4. The apparatus for rapidly determining and marking the point of least resistance to bending, "Neutral Flex Point", within a golf shaft and club in accordance with claim 1, wherein said adjustable force regulator and trough assembly comprises free-floating bearings within said trough assembly.

5. The apparatus for rapidly determining and marking the point of least resistance to bending, "Neutral Flex Point", within a golf shaft and club in accordance with claim 1, wherein said actuator comprises a load cell to identify the required amount of force required to deflect said shaft said pre-defined distance.

6. The method for rapidly determining and marking the point of least resistance to bending, "Neutral Flex Point", within a golf shaft and club in accordance with claim 5, wherein said step of providing an actuator further comprises the step of providing a trough on the end of the actuator which has free-floating bearings within to allow rotation of the tip.

7. The apparatus for rapidly determining and marking the point of least resistance to bending, "Neutral Flex Point", within a golf shaft and club in accordance with claim 1, wherein said retractable printer assembly is further expandable and prints visible and non-visible marks.

8. A method of rapidly determining and marking the point of least resistance to bending, "Neutral Flex Point", within a golf shaft and club, the method comprising the steps of:
   providing a first trough positioned near the butt end of the shaft for the shaft to sit within for maintaining an accurate reference point when working with shafts of different lengths;
   providing a second trough positioned near the tip end of the shaft for the shaft to sit within;
   providing a plurality of interchangeable trough trays of pre-defined trough widths based on varying shaft tip diameters, whereby a single trough tray is located within said second trough for the shaft tip to sit within;
   providing a reproducible tip reference locator with extending and retracting tip reference positioner for establishing a pre-defined shaft tip location to ensure consistent and reproducible measurements of flex weight force;
   providing a butt positioning device for moving the shaft to a pre-defined location so that the tip of the shaft rests at a uniform and pre-defined tip reference point, ensuring the flex weight measurement is obtained from the exact same point on the tip of a shaft regardless of shaft overall length;

providing an adjustable force regulator and trough assembly for exerting pressure against the golf shaft at the butt area in a counter balancing effort against the moveable base to simulate a golfer's grip during a golf swing, whereby said adjustable force regulator adjusts pressure exerted on the golf shaft for the to compensate for humidity and temperature changes to the environment;

providing an actuator to exert a measurable force upon the tip of the shaft over a pre-defined distance of deflection of the shaft;

allowing said shaft to rotate during said deflection so as to locate the "Neutral Flex Point";

allowing the shaft to return to its resting position within said single trough tray by removing the measurable force from said tip of said shaft after said rotation has completed;

providing a retractable print assembly for permanently affixing a "Neutral Flex Point" mark, unique flex weight and identification characteristics on said golf shaft at its neutral flex point location.

marking on the shaft the location of the "Neutral Flex Point" at a position on the upper portion of the shaft while the shaft is in its resting position.

9. The method for rapidly determining and marking the point of least resistance to bending, "Neutral Flex Point", a golf shaft and club in accordance with claim 8, wherein said step of providing a first trough further comprises providing a free-floating, moveable first trough that comprises bearings.

10. The method for rapidly determining and marking the point of least resistance to bending, "Neutral Flex Point", within a golf shaft and club in accordance with claim 8, wherein said step of providing a second trough further comprises providing a print riser.

11. The method for rapidly determining and marking the point of least resistance to bending, "Neutral Flex Point", within a golf shaft and club in accordance with claim 8, wherein said step of providing an adjustable force regulator and trough assembly further comprises the step of providing free-floating bearings within said trough assembly.

12. The method for rapidly determining and marking the point of least resistance to bending, "Neutral Flex Point", within a golf shaft and club in accordance with claim 8, wherein said step of providing an actuator further comprises the step of providing a load cell to identify the required amount of force required to deflect said shaft said pre-defined distance.

13. The method for rapidly determining and marking the point of least resistance to bending, "Neutral Flex Point", within a golf shaft and club in accordance with claim 12, wherein said step of providing an actuator further comprises the step of providing a trough on the end of the actuator which has free-floating bearings within to allow rotation of the tip.

14. The method for rapidly determining and marking the point of least resistance to bending, "Neutral Flex Point", within a golf shaft and club in accordance with claim 7, wherein said step of providing a retractable printer assembly further comprises the step of providing expandability and printing visible and non-visible marks.

15. The method for rapidly determining and marking the point of least resistance to bending, "Neutral Flex Point", within a golf shaft and club in accordance with claim 7, further comprising the step of assembling a marked shaft with a marked golf head by aligning the mark of the "Neutral Flex Point" of the golf shaft with the mark of the neutral point on the golf head.

16. The method for rapidly determining and marking the point of least resistance to bending, "Neutral Flex Point", within a golf shaft and club in accordance with claim 7, further comprising the step of assembling a set of clubs of relative size, wherein each shaft is of identical flex weight.

17. The method for rapidly determining and marking the point of least resistance to bending, "Neutral Flex Point", within a golf shaft and club in accordance with claim 7, further comprising the step of identifying the "Neutral Flex Point" and flex weight of shafts from various manufacturers and matching those shafts by flex weight to golf shafts of other or the same manufacturer, regardless of the shaft composition.

18. The method for rapidly determining and marking the point of least resistance to bending, "Neutral Flex Point", within a golf shaft and club in accordance with claim 7, further comprising the step of assembling a marked shaft with a marked golf head by misaligning the mark of the "Neutral Flex Point" of the golf shaft with the mark of the neutral point on the golf head to introduce a measurable slice or hook within a golf ball's flight path after being struck with said club.

* * * * *